(12) United States Patent
McGeever

(10) Patent No.: US 7,864,158 B1
(45) Date of Patent: Jan. 4, 2011

(54) USE OF GRAPHICAL INFORMATION TO CONTROL PROCESSES

(76) Inventor: Daniel Robert McGeever, 477 Rolling Rd., Bryn Mawr, PA (US) 19010

( * ) Notice: Subject to any disclaimer, the term of this patent is extended or adjusted under 35 U.S.C. 154(b) by 1126 days.

(21) Appl. No.: 10/959,631

(22) Filed: Oct. 6, 2004

(51) Int. Cl.
*G06F 3/33* (2006.01)

(52) U.S. Cl. .................. 345/158; 345/159; 345/160; 345/166; 345/167; 345/165

(58) Field of Classification Search ......... 345/156–169, 345/173, 522, 2.1; 705/2; 700/264, 83, 142, 700/90; 715/733, 700, 740; 235/472.02, 235/382; 348/468; 702/184; 340/538, 870.13, 340/508; 701/207

See application file for complete search history.

(56) References Cited

U.S. PATENT DOCUMENTS

| | | | |
|---|---|---|---|
| 4,749,635 A | 6/1988 | Muller | |
| 5,059,778 A * | 10/1991 | Zouzoulas et al. | 235/472.02 |
| 5,070,479 A | 12/1991 | Nakagawa | |
| 5,420,578 A * | 5/1995 | O'Brien et al. | 340/870.13 |
| 5,426,762 A | 6/1995 | Nakagawa | |
| 5,508,720 A * | 4/1996 | DiSanto et al. | 345/169 |
| 5,617,515 A * | 4/1997 | MacLaren et al. | 700/264 |
| 6,030,292 A | 2/2000 | Hirano | |
| 6,052,131 A | 4/2000 | Oka | |
| 6,069,635 A | 5/2000 | Suzuoki | |
| 6,408,328 B1 | 6/2002 | Haury | |
| 6,466,203 B2 * | 10/2002 | Van Ee | 345/173 |
| 6,556,695 B1 | 4/2003 | Packer | |
| 6,694,211 B2 * | 2/2004 | Hosel | 700/142 |
| 6,836,726 B2 * | 12/2004 | Sanchez Peiro | 701/207 |
| 6,853,883 B2 * | 2/2005 | Kreikemeier et al. | 700/284 |
| 6,911,969 B1 * | 6/2005 | Nelson et al. | 345/163 |
| 6,971,063 B1 * | 11/2005 | Rappaport et al. | 715/733 |
| 7,017,116 B2 * | 3/2006 | Elsbree et al. | 715/740 |
| 7,095,416 B1 * | 8/2006 | Johns et al. | 345/522 |
| 7,206,885 B2 * | 4/2007 | Gruner et al. | 710/300 |
| 7,221,405 B2 * | 5/2007 | Basson et al. | 348/468 |
| 7,262,693 B2 * | 8/2007 | Karschnia et al. | 340/508 |
| 7,515,977 B2 * | 4/2009 | Eryurek et al. | 700/83 |
| 2002/0033795 A1 * | 3/2002 | Shahoian et al. | 345/156 |
| 2002/0035484 A1 * | 3/2002 | McCormick | 705/2 |
| 2002/0080091 A1 * | 6/2002 | Acharya et al. | 345/2.1 |
| 2002/0107586 A1 * | 8/2002 | Kreikemeier et al. | 700/65 |
| 2003/0071733 A1 * | 4/2003 | Hall et al. | 340/573.1 |
| 2003/0107588 A1 * | 6/2003 | Elsbree et al. | 345/700 |
| 2004/0080487 A1 * | 4/2004 | Griffin et al. | 345/156 |
| 2004/0230327 A1 * | 11/2004 | Opheim et al. | 700/83 |
| 2005/0122930 A1 * | 6/2005 | Zhao et al. | 370/328 |
| 2005/0141681 A1 * | 6/2005 | Graiger | 379/90.01 |
| 2005/0222698 A1 * | 10/2005 | Eryurek et al. | 700/90 |
| 2006/0161393 A1 * | 7/2006 | Zielinski et al. | 702/184 |
| 2007/0285224 A1 * | 12/2007 | Karschnia et al. | 340/538 |
| 2008/0065243 A1 * | 3/2008 | Fallman et al. | 700/83 |
| 2008/0191009 A1 * | 8/2008 | Gressel et al. | 235/382 |

* cited by examiner

*Primary Examiner*—Prabodh M Dharia
(74) *Attorney, Agent, or Firm*—Dillis V. Allen, Esq.

(57) ABSTRACT

A method and apparatus comprising a hand held controller adapted to communicate with at least one item of process equipment. The controller communicates to an operator through a screen using at least one graphical image. The operator uses the image to assess at least one operational parameter of the equipment. The operator may manipulate the controller to alter the parameter of the equipment.

13 Claims, 5 Drawing Sheets

USE OF GRAPHICAL INFORMATION TO CONTROL PROCESSES

BACKGROUND

1. Field of the Invention

The invention relates to controlling process equipment. More specifically, the invention relates to use of handheld controllers having graphical representations of process equipment to control process equipment by manipulating the graphical representations.

2. Background

Complex chemical or manufacturing processes require oversight by people capable of assessing the functioning of the processes. Typically this oversight is provided by one or more engineers, or senior operators, familiar with the process being performed. These complex processes are the result of a number of smaller processes whose output in combination produces the desired product.

For example, a complex chemical process may be broken down into smaller actions, or operations. These operations may be standardized and referred to as unit operations. Typical unit operations include, but are not limited to, mixing, separating, reacting, and heat exchange. Each unit operation has process parameters that require control and monitoring.

Each unit operation may be further broken down into standard elements of the unit operation. These elements include, but are not limited to, pipes entering the unit operation, pipes exiting the unit operation, and pumps. These elements each have process parameters that require control and monitoring.

As an example, a single pump in a chemical plant, which may have over 50 pumps, will be monitored for at least: input pressure, output pressure, and some measure of work performed by the pump, usually revolutions per minute (RPM). In fact, the pump may be monitored for six or more parameters.

For context, it is easily possible for a simple plant to require four unit operations. This plant may require many dozens of elements to perform those four unit operations. On average, each element may require monitoring and control of up to approximately six parameters. In this situation, is it easily possible for this simple plant to require monitoring and control of hundreds of parameters.

Collecting, storing, collating, and displaying all this data in a comprehensible manner is a monumental task. Typically process plants devote a whole room to gathering and displaying this data. The room usually contains a very large display board mapping out the entire plant along with parameter data from each of the elements used to perform the unit operations. While convenient, this control room removes the engineer or senior operator from the plant. This removal makes it difficult for an engineer outside the control room to check the functioning of the equipment in operation. An Engineer in the control room can not work on the equipment, and an engineer near some equipment can not determine the condition of the operation.

A convenient, portable and flexible method for allowing an engineer in a plant, away from the control room to access the parameter data of equipment in the plant without having to enter the room would enhance the engineer's ability to monitor the condition of the plant. This method and apparatus should be able to give the engineer detailed information about any part of the plant, and enable the engineer to see at a glance if the entire plant is operating within expectations.

DETAILED DESCRIPTION

Reference will now be made to drawings wherein like structures will be provided with like reference designations. In order to show the structures of the claims most clearly, the drawings included herein are diagrammatic representations of the structures discussed. Thus, the actual appearance of the fabricated structures, for example in a photograph, may appear different while still incorporating the essential structures of the claims. Moreover, the drawings show only the structures necessary to understand the claims. Additional structures known in the art have not been included to maintain the clarity of the drawings.

Computer and video games have advanced the art of conveying abstract information graphically and understandably. These games have also developed an ability to translate a point of interest through complex and convoluted landscapes of information. These translation techniques rapidly become intuitive after a brief introduction to the game. These games also allow the moving point of interest to interact with the informational landscape through which it moves. The prevalence of computer and video games regularly increases the pool of people able to adjust to communicating through abstract graphical imagery.

A character in a computer or video game may be displayed as an icon, or easily recognized figure. Sometimes these icons may be very elaborate, and depending on the computer power available, quite life like. These icons may be accompanied by shapes or symbols depicting abstract concepts such as health, energy or ammunition. Sometimes these shapes may be accompanied by redundant numbers reinforcing the value of the abstract concept. The numbers may in some instances replace the shape or symbol. The value of these concepts may be indicated by the size of the symbol or shape. For example, the quantity of ammunition available to a character may be displayed by the length of a bar. The value of the concepts may also be indicated by color. For example a healthy character may appear green, while an injured character may appear yellow, and a seriously injured character may appear red. Also a character may be accompanied by a bar of varying length that is colored green then yellow and finally red as the bar becomes smaller indicating loss of life.

A character may be caused to navigate through and interact with its environment through intuitive controls on a hand held controller. The character may avoid trees, or cliffs, or buildings. While traveling through the landscape, the character may also pick up or drop various items, such as ammunition, money, weapons or food. Manipulating the environment this way may be accomplished by the activation of a few buttons on a hand held controller.

Figure 1:
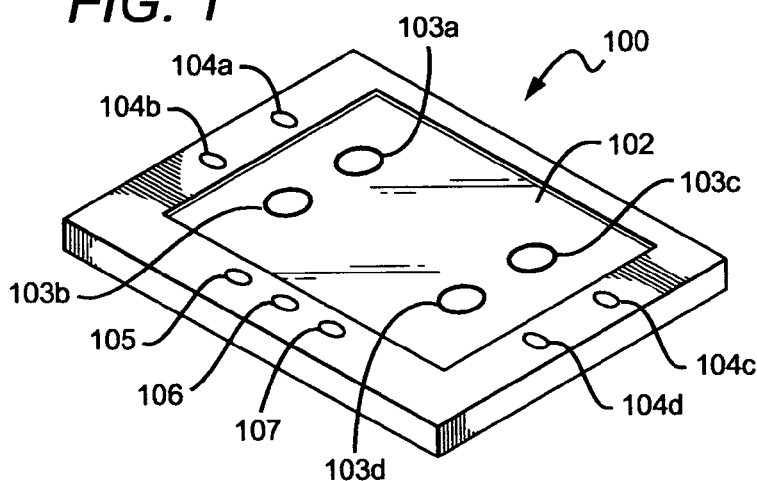
FIG. 1 is a schematic isometric view of a generic video game controller.

FIG. 1 is an illustration of a hand held video controller 100. Liquid crystal plate (LCD) 102 display an environment, characters and items in the landscape 103a-103d. Buttons 104a-104d control movement of the character in the display 102. Button 105 may be a pick up and drop command. Button 106 may be an action command. Button 107 may speed up or slow down play.

In one embodiment, item in landscape 103a may be a sack of coins. Items in landscape 103b and 103c may be obstacles, for example trees. A character representation 103d in LCD 102 may navigate the background displayed in response to prompts from buttons 104a-104d. Button 104a may cause character 103d to move up. Button 104b may cause character 103d to move down. Button 104c may cause character 103d to move left. And button 104a may cause character 103d to move right.

Using a succession of button inputs from buttons 104a-104d, character 103d may navigate between trees 103b and 103c to approach sack of coins 103a. After arriving at sack of coins 103a, character 103d may be induced to pick up sack 103a by pressing button 105. In this way, by activating a few buttons on the hand held controller 100, character 103d may interact with and manipulate its environment.

Figure 2:
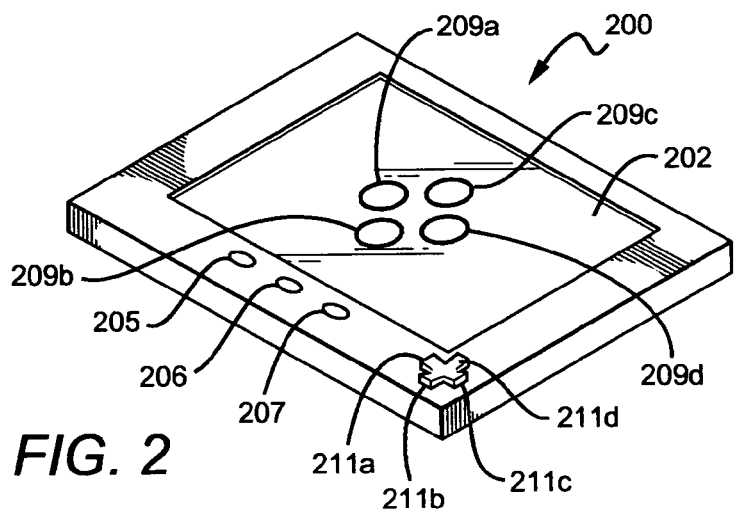
FIG. 2 is a schematic isometric view of a generic video game controller.

FIG. 2 is another illustration of a hand held video controller 200. LCD plate 202 displays an environment, characters and items in the landscape 209a-209d. Cross shaped button 211 having extremities 211a-211d controls movement of the character in the display 202. Button 205 may be a pick up and drop command. Button 206 may be an action command. Button 207 may speed up or slow down play.

In one embodiment, item in landscape 209a may be a sack of coins. Items in landscape 209b and 209c may be obstacles, for example trees. A character representation 209d in LCD 202 may navigate the background displayed in response to prompts from button extremities 211a-211d. Extremity 211a may cause character 209d to move up. Extremity 211b may cause character 209d to move down. Extremity 211c may cause character 209d to move left. And extremity 211a may cause character 209d to move right.

Using a succession of button inputs from extremities 211a-211d, character 209d may navigate between trees 209b and 209c to approach sack of coins 209a. After arriving at sack of coins 209a, character 209d may be induced to pick up sack 209a by pressing button 205. In this way, by activating a few buttons on the hand held controller 200, character 209d may interact with and manipulate its environment.

Figure 3:
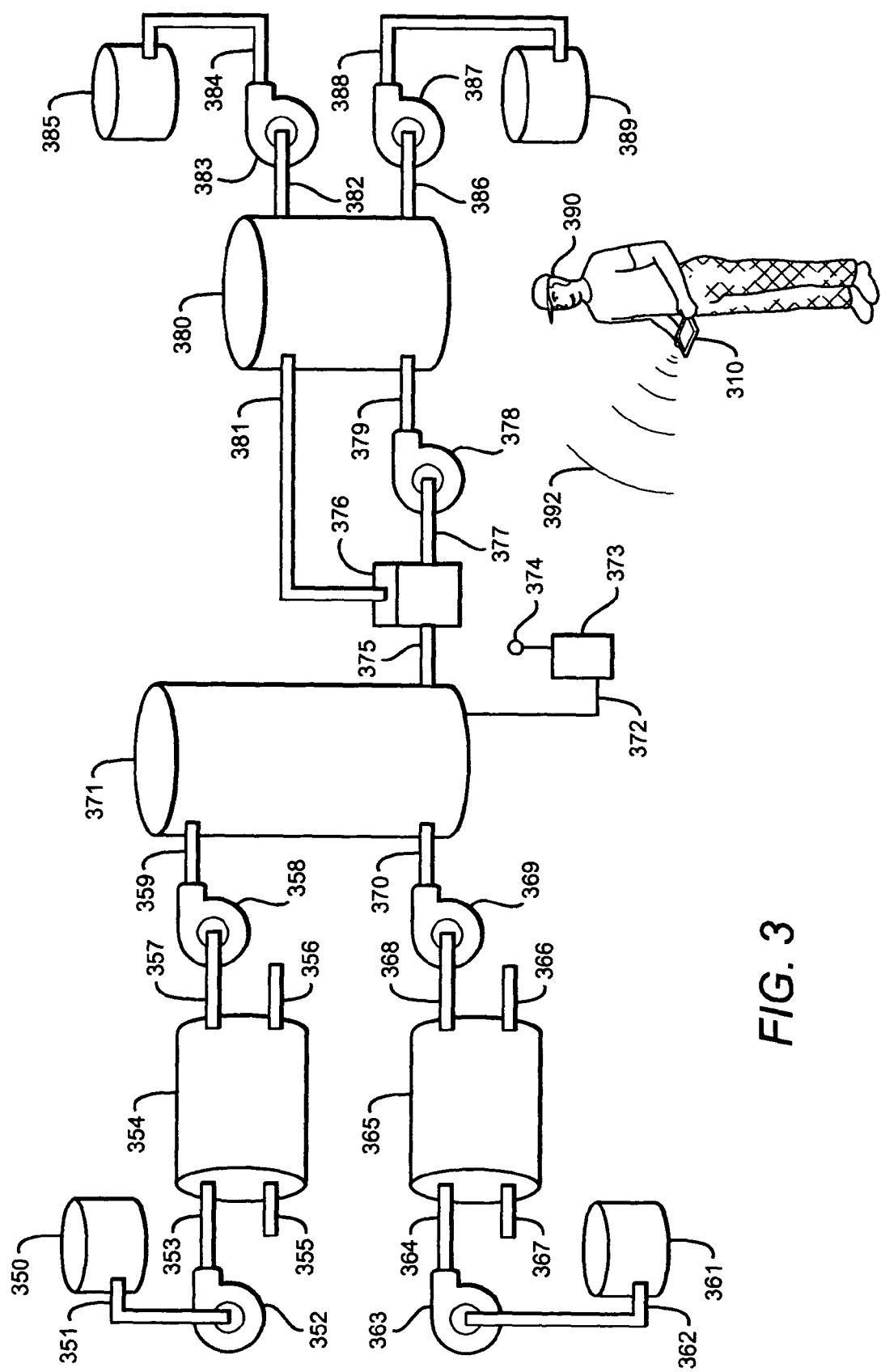
FIG. 3 is a schematic isometric view of one embodiment of the claims.

FIG. 3 is an illustration of the complexities that maybe encountered in monitoring even a simple chemical process. The process detailed in FIG. 3 involves reacting two feed chemicals in a reactor to produce one product chemical and one by-product chemical. This like all chemical processes may be broken down onto constituent unit operations. A unit operation is a part of a larger process that results in a single chemical or physical change within a process. For example, this process comprises removing from storage and adjusting the temperature of two feed chemicals, mixing the feed chemicals and causing them to react to form a product chemical and a by-product chemical, separating the product from the by product, and storing the product separately from the by-product.

A first feed chemical in storage tank 350 leaves the tank through pipe 351. Pipe 351 feeds into pump 352, where the feed chemical is impelled to a higher pressure. The feed chemical leaves pump 352 through pipe section 353, and enters heat exchanger 354. A heat transfer fluid, having altered the temperature of the feed chemical, leaves heat exchanger 354 through pipe section 355. The heat transfer fluid enters heat exchanger 354 through pipe section 356. The feed chemical exits heat exchanger 354 through pipe section 357, and enters pump 358. The feed chemical exits pump 358 through pipe section 359.

A second feed chemical in storage tank 361 leaves the tank through pipe 362. Pipe 362 feeds into pump 363, where the feed chemical is impelled to a higher pressure. The feed chemical leaves pump 363 through pipe section 364, and enters heat exchanger 365. A heat transfer fluid enters heat exchanger 365 through pipe section 366. The heat transfer fluid, having altered the temperature of the feed chemical, leaves heat exchanger 365 through pipe section 367. The feed chemical exits heat exchanger 365 through pipe section 368, and enters pump 369. The feed chemical exits pump 369 through pipe section 370.

Chemicals enter reaction chamber 371 through pipe sections 359 and 370. In chamber 371 the chemicals are mixed, and caused to react forming one produce chemical and one by-product chemical. All of the elements in this process are being monitored for process parameters. This parameter data is collected and transferred by wire 372 to transceiver 373. Transceiver 373 sends and receives wireless signals through antenna 374. The product and by-product chemicals formed in reactor 371 leave the reactor through pipe section 375.

Pipe section 375 deposits the reaction products in re-mixer 376. The reaction products leave re-mixer 376 through pipe section 377 and enter pump 378. Pump 378 impels the reaction products through pipe section 379 and into separator 380. Separator 380 removes the by-product from the product of the reaction. Some of the by-product remains entrained in some of the product within separator 380. This mix may be refluxed into pipe section 381 for return to re-mixer 376 where it will be recombined with the reaction products to again attempt separation in separator 380.

Reaction product leaves separator 380 through pipe section 382. Pump 383 impels the product through pipe section 384 into storage tank 385. Reaction by-product leaves separator 380 through pipe section 386. Pump 387 impels the by-product through pipe section 388 into storage tank 389. Human operator or engineer 390 uses controller 310 to monitor the process parameters while being able to move around the plant containing the above referenced equipment. In one embodiment, controller 310 communicates with transceiver 373 using electromagnetic radiation 392.

Figure 4:
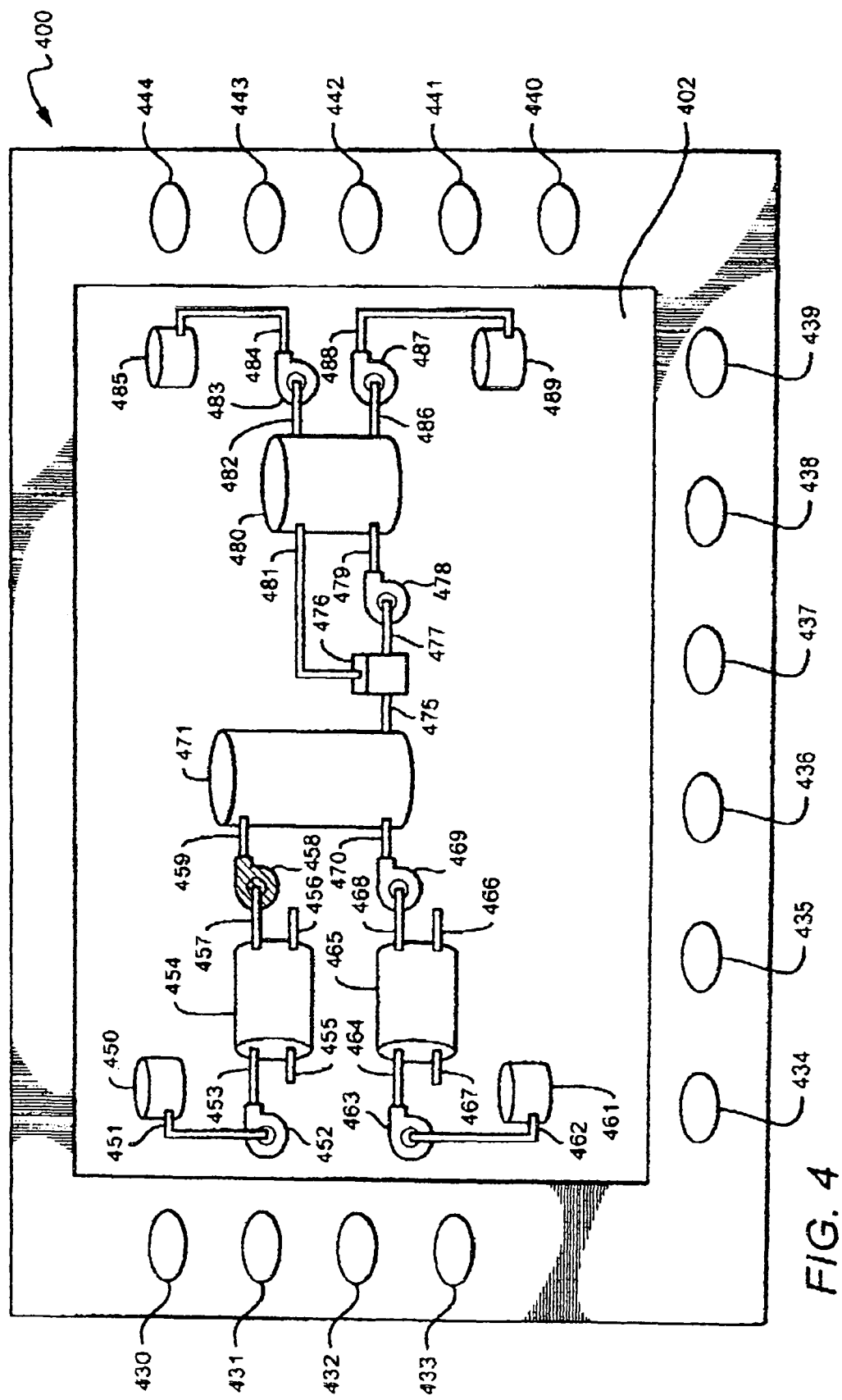
FIG. 4 is a schematic plan view of a screen display.

FIG. 4 shows one embodiment of a controller 400 that may be used to monitor the process parameters of any of the equipment illustrated in FIG. 3. All of the process equipment in FIG. 3 is represented in LCD screen 402 shown in FIG. 4, with the exception of wire 372, transceiver 373 and antenna 374. All of the equipment in FIG. 3 displayed in FIG. 4, has had their reference numbers incremented by 100. For example, the storage tank 350 in FIG. 3 is represented by graphical icon of a storage tank 450 on LCD screen 402 in FIG. 4. The frame of controller 400 has arrayed around its sides and bottom two columns and a row of buttons numbered counter-clockwise starting in the upper left 430 to 444.

In one embodiment, buttons 430-433 in FIG. 4 enable the operator to give commands to an item of process equipment. Button 430 may raise the process parameter being examined. Button 431 may lower the process parameter being examined. Button 432 may initiate, or turn on, the process parameter being examined. Button 433 may stop the process parameter being examined.

In one embodiment, buttons 434-439 in FIG. 4 enable the operator to navigate the graphical representation of the process. Button 434 may move the focus of interest down the process stream from one item of equipment to the next. For example, if the focus of interest is pump icon 478 selecting button 434 will shift the focus of interest to pipe section icon 479. Button 435 may move the focus of interest down the process stream from one item of equipment to the next item where that second item is outside of its designated process parameters. Button 436 may move the focus of interest up the process stream from one item of equipment to the next. For example, if the focus of interest is pump icon 478 selecting button 436 will shift the focus of interest to pipe section icon 477. Button 437 may move the focus of interest up the process stream from one item of equipment to the next item where that second item is outside of its designated process parameters. Button 438 may zoom the display in for a view of fewer equipment items. Button 439 may zoom the display out for a view of more equipment items.

In one embodiment, buttons 440-444 in FIG. 4 enable the operator to navigate the parameter data of the process equipment. Buttons 440-444 allow the operator to select the process parameter of interest from all the parameter data displayed on LCD screen 402, as will be seen later.

In one embodiment, shown in FIG. 4, an operator may view the condition of all of the items of equipment in a process at a glance. In one embodiment, when pump 358 of FIG. 3 is performing outside of its expected range, pump icon 458 will be colored or sized differently than any other item of equipment displayed on screen 402. This difference in color or size allows the operator to spot anomalies quickly. If the focus on interest on screen 402 is pipe section 475, the operator may depress button 437 which will shift the focus of interest to pump icon 458. Depressing button 438 will zoom the display into the display to show fewer items of equipment, as is shown in FIG. 5.

Figure 5:
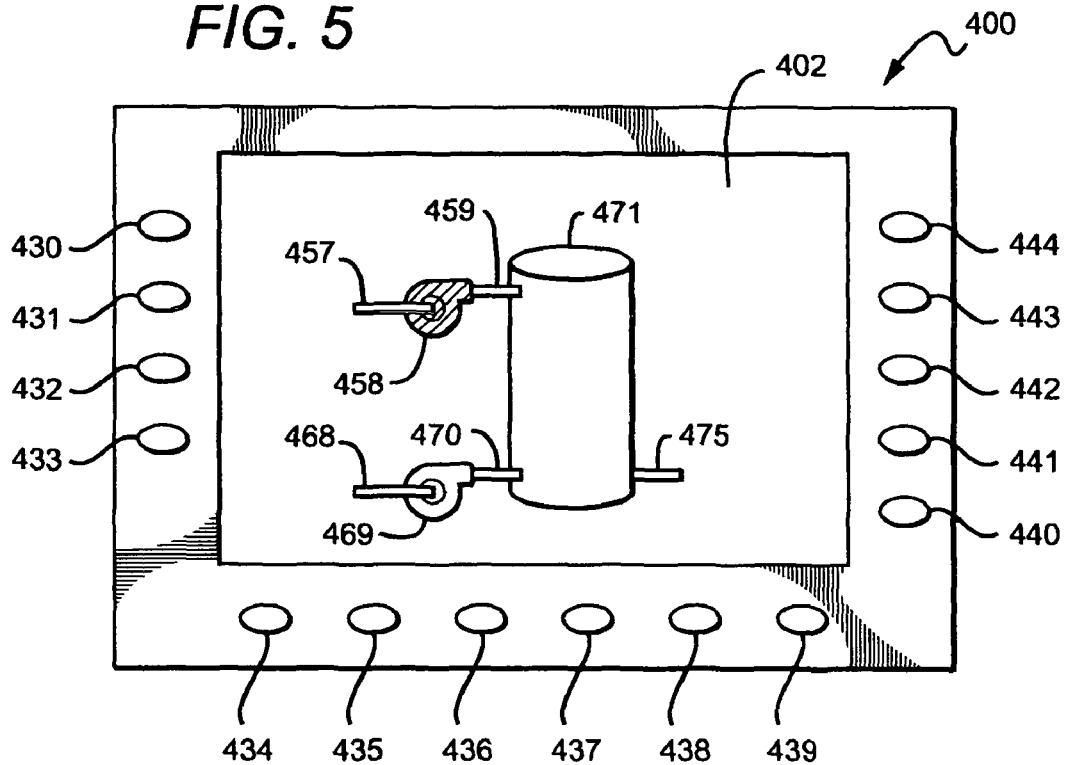
FIG. 5 is a schematic plan view of a screen display.

FIG. 5 shows one embodiment of a controller 400 that has been zoomed into focus on a smaller number of equipment items. Displayed on screen 402 are pump icons 458 and 469, pipe sections 459 and 470, reaction chamber 471 and finally pipe section 475. Pump icon 458 is colored or sized differently than the other icons, because it is the only item that is operating outside its expected range. Selecting button 438 will zoom the display into a display that shows only the pump icon and those icons directly connected to it, as is shown in FIG. 6.

Figure 6:
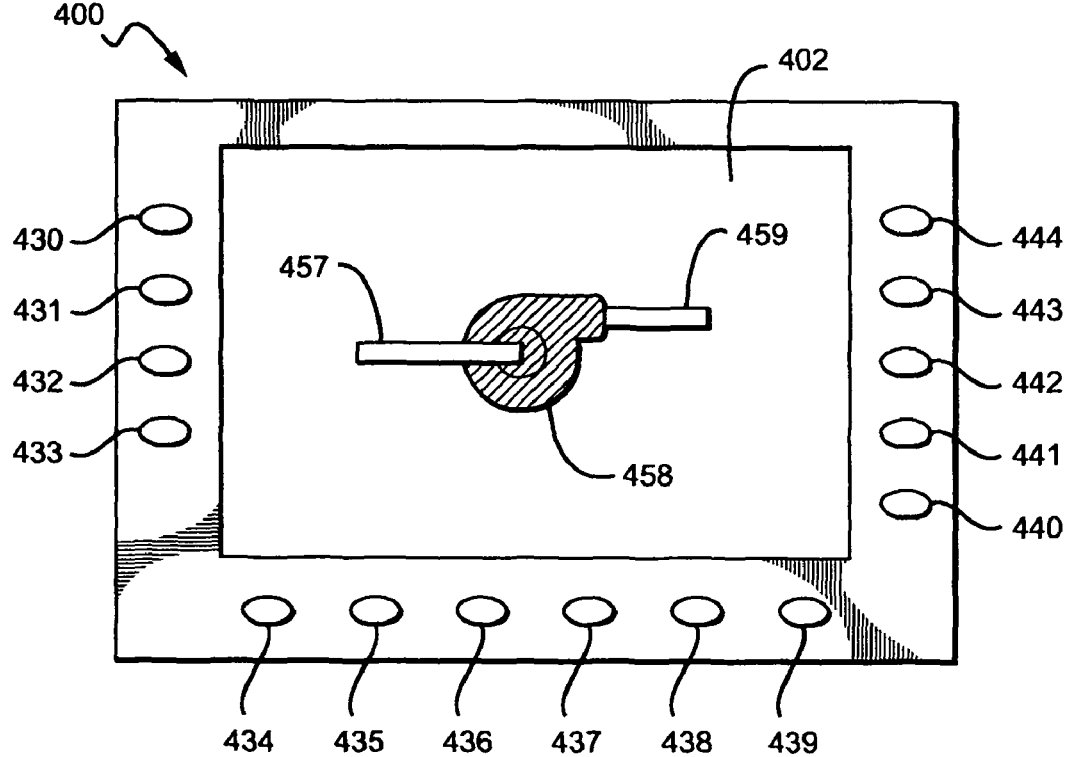
FIG. 6 is a schematic plan view of a screen display.

FIG. 6 shows one embodiment of a controller 400 that has been zoomed into focus onto a single pump icon with its inlet and outlet pipe icons. Displayed on screen 402 are pump icon 458 and pipe sections 457 and 459. Pump icon 458 is colored or sized differently than the other icons, because it is operating outside its expected range. Selecting button 438 will zoom the display in to show the process parameters of pump icon 458, as is shown in FIG. 7.

Figure 7:
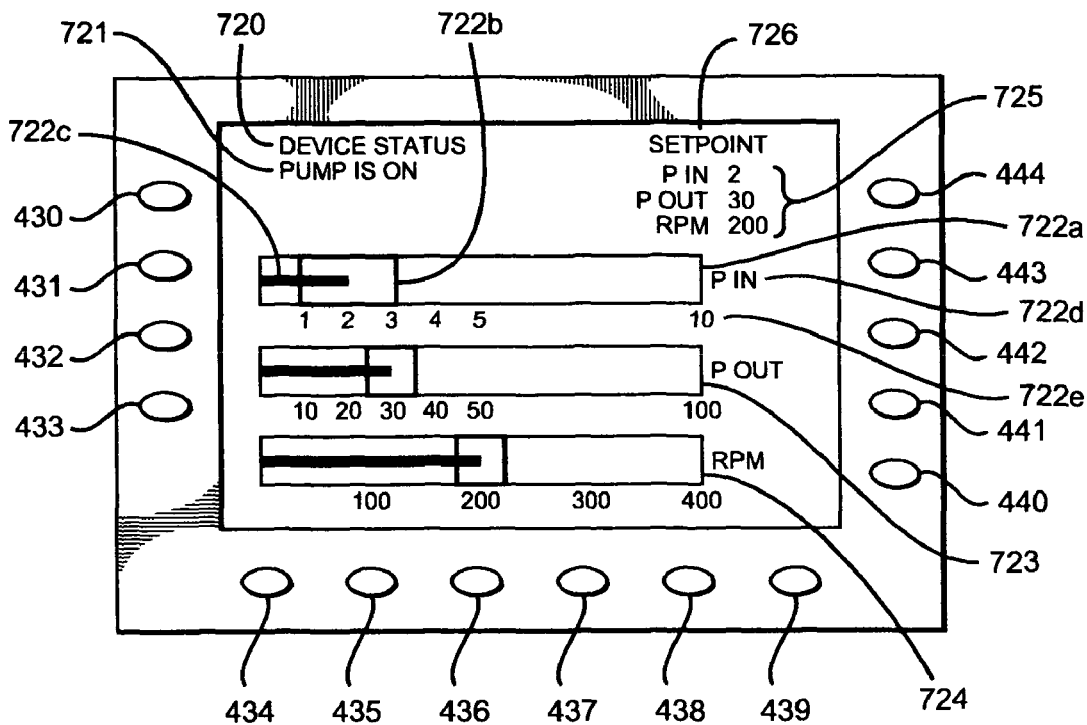
FIG. 7 is a schematic plan view of a screen display.

FIG. 7 illustrates one embodiment of controller 700 with display 702 showing only the parameters of pump icon 458. There may be more than three parameters of interest, however for convenience only three are shown in this embodiment of screen 702. Screen 702 has in the upper left corner lettering that states "device status" 720. This lettering is always present when screen 702 is zoomed to show only parameters of one item of equipment. Under lettering 720 is variable information 721 which here states that "pump in on" Bar data displays 722-724 display the status of data parameters for pump 358 shown in FIG. 3. Bar data display 722 includes the useful range of parameter 722a, the expected range, displayed by a dark bar within the useful range, 722b, the actual value of the parameter 722c, an indication of which parameter is displayed "pressure in"722d and a scale 722e under data bar 722. The right end of data bar 722 has a label describing the parameter being displayed, 722d. For example label 722d states, "P in" referring to the pressure entering pump 358. A scale 722e is positioned beneath the data bar to assist in determining the value of the parameter displayed. A collection of set points 727 of the parameters displayed is found in the upper right hand corner of display 702. These set points are arranged to correspond with the position of their data bars 722-724. The numbers in this set point display vary as the set point is changed.

Buttons 440-444 may be used to navigate among the parameters in FIG. 7. Button 440 may scroll down below the lowest parameter displayed to reveal more parameters. Button 441 may be used to scroll down among the parameters displayed, for example from pressure in to pressure out. Button 442 may be used to select the parameter indicated as the parameter of interest. Selecting a parameter by depressing button 442 allows buttons 430-433 to alter the parameter selected. Button 443 may be used to scroll up among the parameters displayed, for example from pressure out to pressure in. Button 444 may scroll up above the highest parameter displayed to reveal more parameters.

Figure 8:
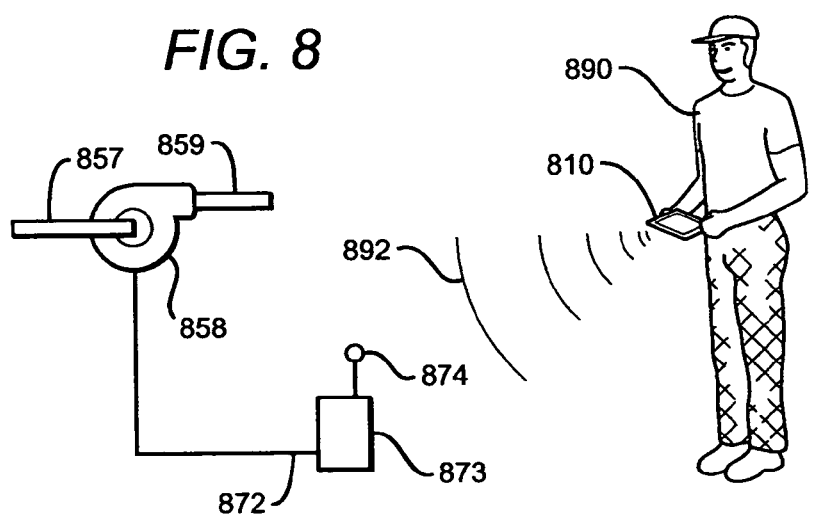
FIG. 8 is schematic isometric view of one embodiment of the claims.

FIG. 8 is an illustration of one embodiment where each equipment item in a chemical process plant, for example pump 858, is connected by wire 872 to a transceiver 873 which sends and receives data through antenna 874. Operator 890 may be seen using controller 810 to communicate wirelessly with transceiver 873 through electromagnetic spectrum 892. This embodiment allow an engineer to quickly query an item of equipment without having to return to the control room.

Figure 9:
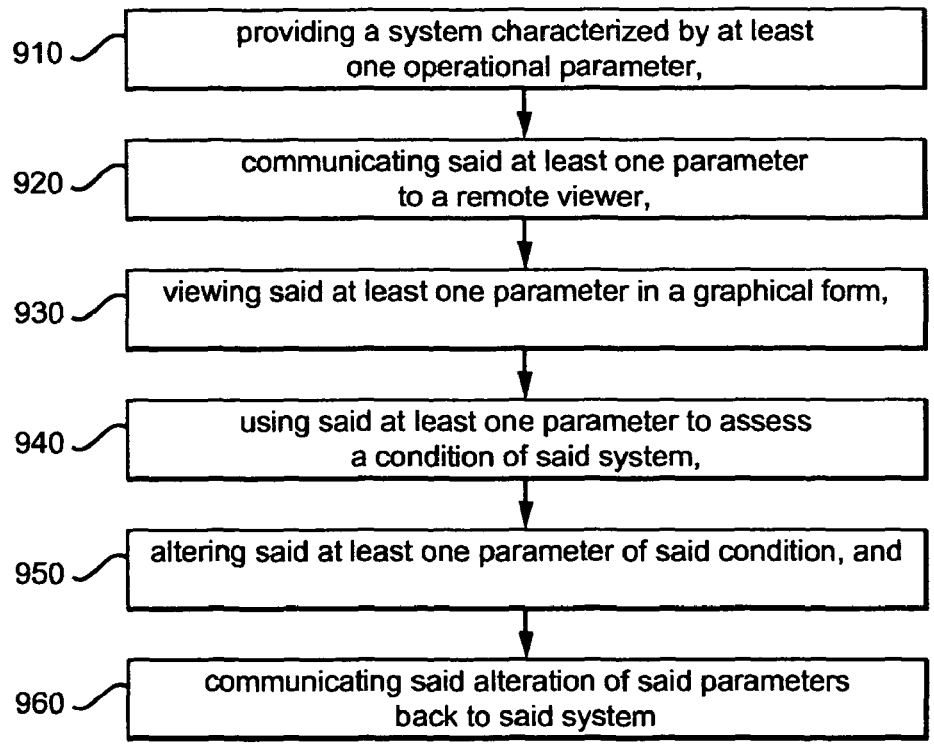
FIG. 9 is a flow chart demonstrating one embodiment of the claims.

FIG. 9 is a flow chart showing one method of using graphical information to control processes. Providing a system characterized by at least one operational parameter is shown in block 910. Communicating said at least one parameter to a remote viewer is shown in block 920. Viewing said at least one parameter in a graphical form is shown in block 930. Using said at least one parameter to assess a condition of said system is shown in block 940. Altering said at least one parameter of said condition is shown in block 950. Communicating said alteration of said parameters back to said system is shown in block 960.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative, rather than a restrictive, sense.

What is claimed is:

1. An apparatus comprising: a hand held controller adapted to communicate with at least one item of process equipment, said controller communicating to an operator through a screen, said process equipment including multiple unit operations each having at least one parameter, said controller having an input for receiving the existing unit operations parameters, said controller graphically displaying multiple unit operations and the unit operations parameters so the operator can determine if the parameters are within an expected range, said controller enabling the user to navigate on screen between unit operations and to focus on any desired unit operation, said controller with an operator input modifying the parameters inside of the expected range, and said controller displaying the altered parameters on the screen so the operator can determine if they are within the expected range.

2. The apparatus of claim 1, wherein said screen is removably attached to said controller.

3. The apparatus of claim 1, wherein said controller communicates with said equipment through a hard line.

4. The apparatus of claim 3, wherein said hard line comprises one of a flexible wire or a flexible cable.

5. The apparatus of claim 1, wherein said controller communicates with said equipment through a wireless medium.

6. The apparatus of claim 5, wherein said medium comprises one of a radio frequency or an optical frequency.

7. The apparatus of claim 1, wherein said graphical image comprises at least one of an icon and a bar.

8. The apparatus of claim 7, wherein said graphical image is accompanied by at least one numerical indication of said parameter.

9. The apparatus of claim 7, wherein said graphical image indicates variation from a prescribed parameter by alteration of one of color and size of said image.

10. A method comprising: providing a system characterized by process equipment including a plurality of unit operations each having at least one variable parameter, enabling the user through a hand-held computer-screen to see and navigate on screen between the unit operations and to focus on screen upon any desired unit operation, viewing at least one parameter in a graphical form, using said at least one parameter to assess a condition of said system, altering said at least one parameter of said condition, and communicating said alteration of said parameters back to said system.

11. The method of claim 10, wherein said graphical form comprises at least one of an icon and a bar.

12. The method of claim 11, wherein said graphical form is accompanied by at least one numerical indication of said parameter.

13. The method of claim 11, wherein said graphical form indicates variation from a prescribed parameter by alteration of one of color and size of said image.

* * * * *